US009349239B2

(12) United States Patent
Willemse et al.

(10) Patent No.: US 9,349,239 B2
(45) **Date of Patent: *May 24, 2016**

(54) AUTOMATED MEDICAMENT DISPENSER WITH SCREW SINGULATOR

(76) Inventors: Waldemar Willemse, Poway, CA (US); Werner Waidamar Willemse, San Diego, CA (US); Clasina Aletta Willemae, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,058

(22) Filed: Dec. 14, 2010

(65) Prior Publication Data

US 2011/0313567 A1 Dec. 22, 2011

Related U.S. Application Data

(63) Continuation-in-part of application No. 11/482,889, filed on Jul. 7, 2006, now Pat. No. 7,853,355.

(51) Int. Cl.

| | |
|---|---|
| ***G06F 17/00*** | (2006.01) |
| ***G07F 11/32*** | (2006.01) |
| ***G07F 9/02*** | (2006.01) |
| ***G07F 11/00*** | (2006.01) |
| ***G07F 11/16*** | (2006.01) |
| ***G07F 11/62*** | (2006.01) |
| ***G07F 17/00*** | (2006.01) |
| *A61J 7/02* | (2006.01) |

(52) U.S. Cl.

CPC ................ *G07F 11/32* (2013.01); *G07F 9/026* (2013.01); *G07F 11/002* (2013.01); *G07F 11/165* (2013.01); *G07F 11/62* (2013.01); *G07F 17/0092* (2013.01); *A61J 7/02* (2013.01)

(58) Field of Classification Search

CPC ..................................... A61J 1/03; A61J 7/02

USPC ......................................... 700/236, 242–244

See application file for complete search history.

(56) References Cited

U.S. PATENT DOCUMENTS

| | | | | | |
|---|---|---|---|---|---|
| 3,292,768 | A | * | 12/1966 | Matthews | 198/445 |
| 3,319,825 | A | * | 5/1967 | Dore | 221/186 |
| 3,710,921 | A | * | 1/1973 | Petiet | 198/383 |
| 4,136,803 | A | * | 1/1979 | Tobias et al. | 222/413 |
| 4,469,217 | A | * | 9/1984 | Meyer et al. | 198/419.2 |
| 4,600,119 | A | * | 7/1986 | Olson | 221/75 |
| 4,657,130 | A | * | 4/1987 | Ackley et al. | 198/397.04 |
| 5,213,232 | A | * | 5/1993 | Kraft et al. | 221/277 |
| 5,222,634 | A | * | 6/1993 | Hayes | 222/185.1 |
| 5,884,806 | A | * | 3/1999 | Boyer et al. | 221/75 |
| 5,907,493 | A | * | 5/1999 | Boyer et al. | 700/231 |
| 7,255,247 | B2 | * | 8/2007 | Aylward | 221/168 |
| 7,624,894 | B2 | * | 12/2009 | Gerold et al. | 221/124 |
| 7,681,408 | B2 | * | 3/2010 | Hobson et al. | 62/137 |
| 7,853,355 | B1 | * | 12/2010 | Willemse et al. | 700/243 |
| 8,066,150 | B2 | * | 11/2011 | Clarke et al. | 221/198 |
| 8,272,534 | B2 | * | 9/2012 | Clarke et al. | 221/198 |

* cited by examiner

*Primary Examiner* — Michael K Collins

(74) *Attorney, Agent, or Firm* — John R. Ross; John R. Ross, III

(57) ABSTRACT

An automated medicament dispensing machine for dispensing and counting individual medicaments. A medicament supply bin holds a plurality of medicaments. A singulator extends into the medicament supply bin and functions to singulate the plurality of medicaments. The singulator includes a trough that extends into the medicament supply bin. A helix is positioned over the top of the trough. The helix is uncovered at its top. A motor is connected to the helix and rotates the helix so that excess medicaments fall backwards along the trough or into the medicament supply bin as individual medicaments are singulated.

7 Claims, 11 Drawing Sheets

Fig. 3 a
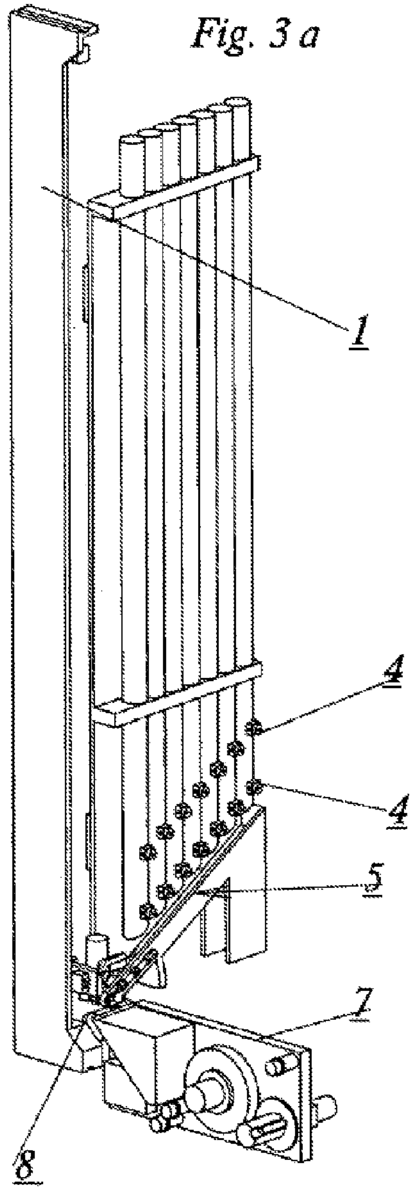
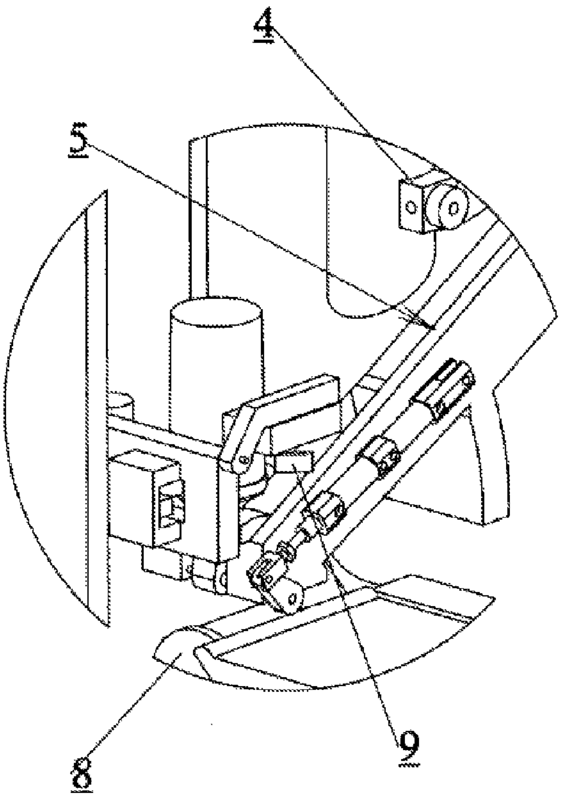
Fig. 3 b

AUTOMATED MEDICAMENT DISPENSER WITH SCREW SINGULATOR

The present invention relates to automated medicament dispensing devices, and in particular, to singulators for automated medicament dispensing devices. This application is a continuation-in-part of application Ser. No. 11/482,889, filed Jul. 7, 2006, which issued as U.S. Pat. No. 7,853,355, issue date Dec. 14, 2010, and which is incorporated herein by reference.

BACKGROUND OF THE INVENTION

Pharmacies normally dispense medication based on patient's prescriptions as either pre-packaged (where the correct number of doses is pre-packed in a container) or as medicament where a prescribed number of pills are counted into a vial from a supply container.

Automatic medicament dispensing machines are also known in the prior art. However, the prior art has not effectively determined a reliable method for automatically counting pills for dispensing. It is very important that the absolute correct number of pills is dispensed so that the patient will have the correct amount of medication for treatment. To effectively count pills the automatic machine must have a device that singulates the pills so that they can be counted one-by-one. This is where the prior art has had difficulty.

Archimedes Screw

The Archimedes screw is well known and is one of several inventions and discoveries traditionally attributed to Archimedes in the 3rd century BC. The Archimedes' screw consists of a screw inside a hollow pipe. The screw is turned usually by a windmill or by manual labor. As the bottom end of the tube turns, it scoops up a volume of water. This amount of water will slide up in the spiral tube as the shaft is turned, until it finally pours out from the top of the tube and feeds the irrigation systems. It was mostly used for draining water out of mines.

The contact surface between the screw and the pipe does not need to be perfectly water-tight because of the relatively large amount of water being scooped at each turn with respect to the angular frequency and angular speed of the screw. Also, water leaking from the top section of the screw leaks into the previous one and so on, so a sort of mechanical equilibrium is achieved while using the machine, thus limiting a decrease in mechanical efficiency.

What is needed is a better medicament dispensing device.

SUMMARY OF THE INVENTION

The present invention provides an automated medicament dispensing machine for dispensing and counting individual medicaments. A medicament supply bin holds a plurality of medicaments. A singulator extends into the medicament supply bin and functions to singulate the plurality of medicaments. The singulator includes a trough that extends into the medicament supply bin. A helix is positioned over the top of the trough. The helix is uncovered at its top. A motor is connected to the helix and rotates the helix so that excess medicaments fall backwards along the trough or into the medicament supply bin as individual medicaments are singulated.

BRIEF DESCRIPTION OF THE DRAWINGS

FIGS. 3*a*-3*d* show a preferred method for handling vials.

DETAILED DESCRIPTION OF THE PREFERRED EMBODIMENTS

Figure 1A:
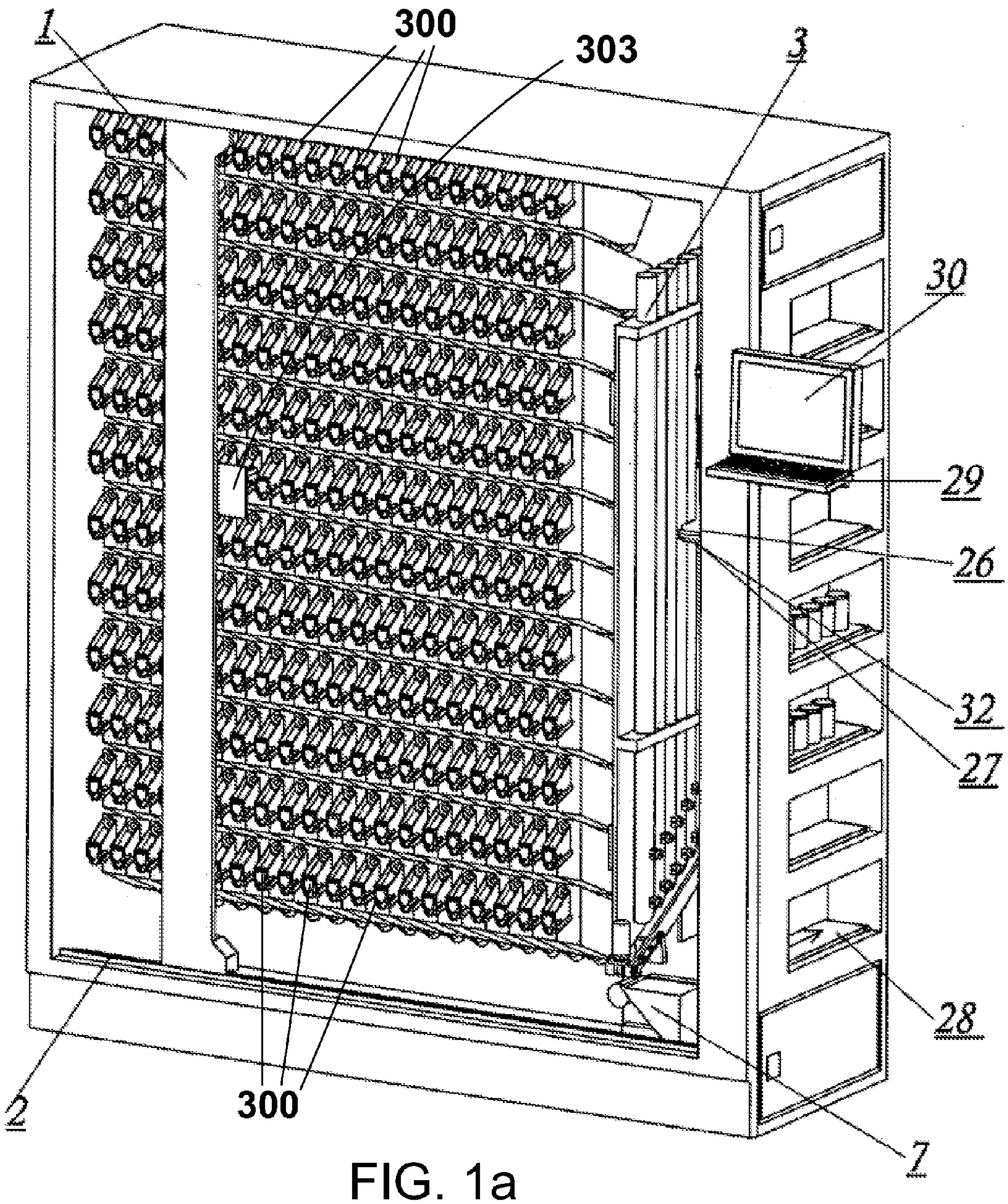
FIG. 1*a* shows a preferred embodiment of the present invention.
Figure 1B:
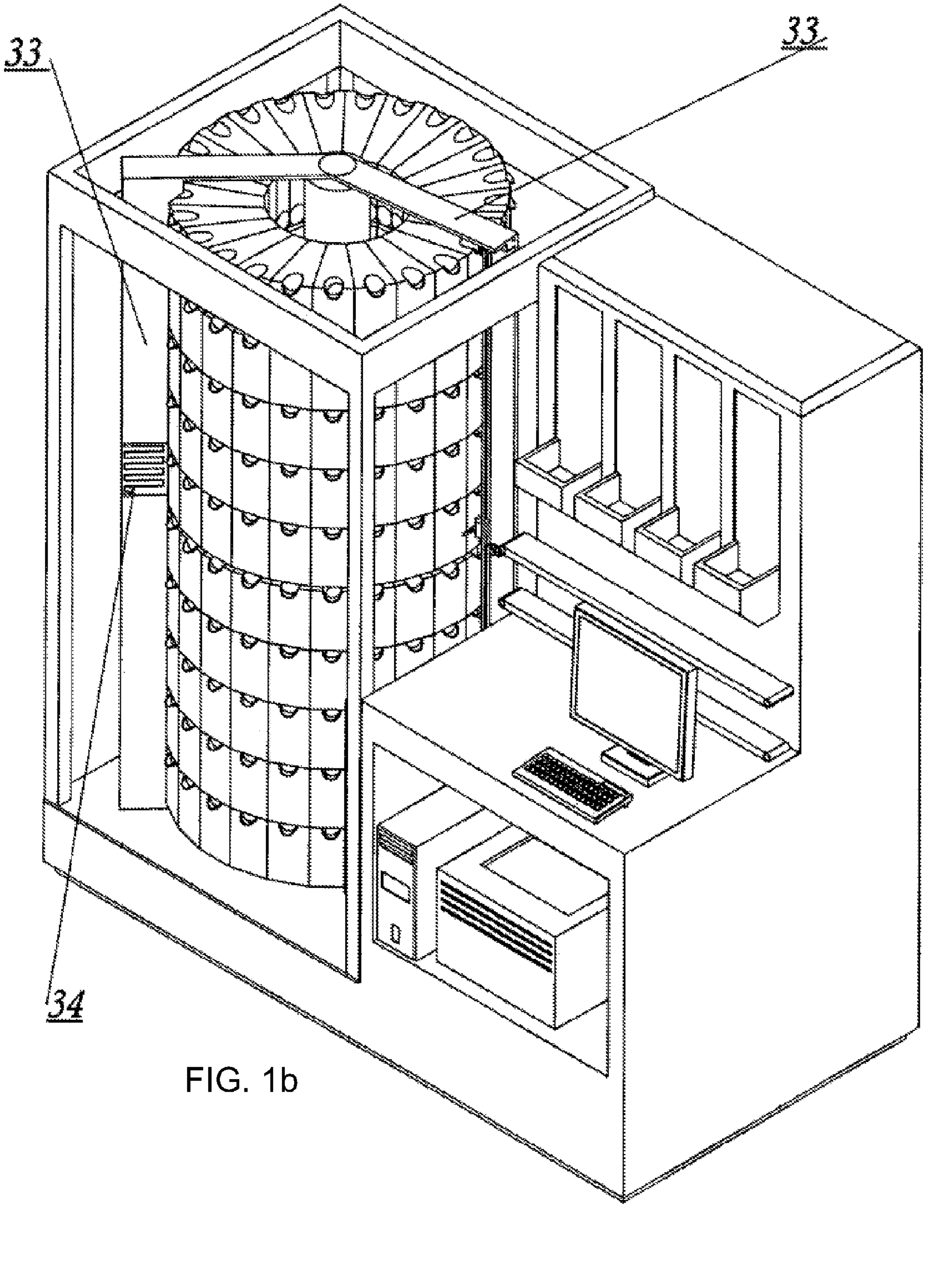
FIG. 1*b* shows another preferred embodiment of the present invention.

FIG. 1*a* shows a general view of robotic arm 303 and medicament supply bins 300 arranged in a column and row configuration. This view shows touch screen computer 30 and keyboard 29. Robotic arm 303 is provided with a column vertical elevator moving device 1 and a horizontal moving device 2. FIG. 1*b* indicates a multi-level carousel configuration. The vertical elevator carries the gripper 34, while the rotary movement is provided by arm 33.

Figure 3C:
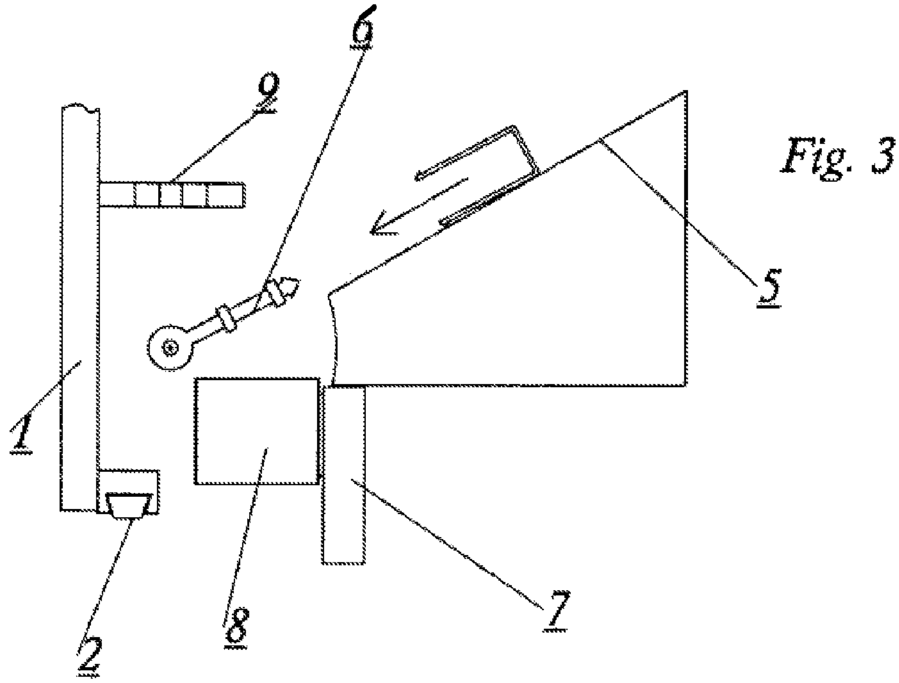
Figure 3D:
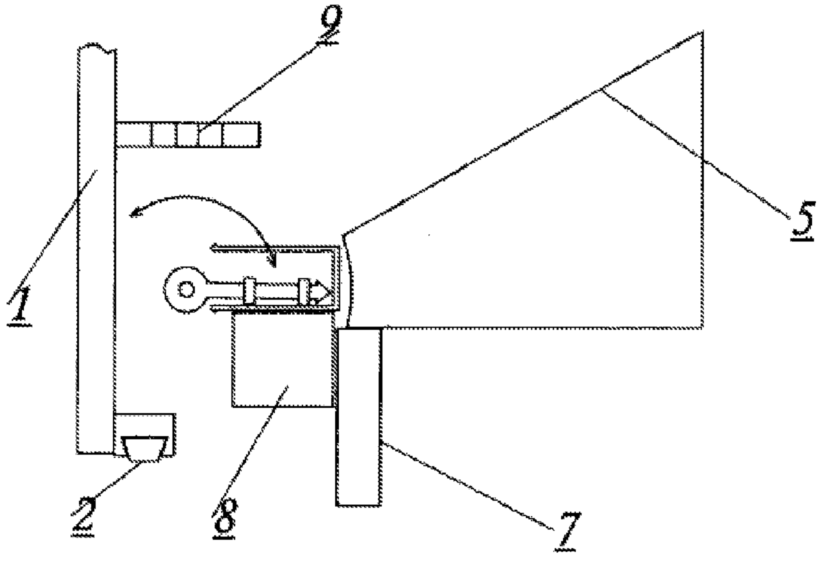

Robotic arm 303 has a simple passive, spring loaded claw 9 to grip the vial (FIG. 3*b*). Empty vials of various sizes are dispensed from a space saving vertical Cartesian matrix 3, as shown in FIG. 1*a*. A required vial is released by toggling of the support holders 4, as shown in FIG. 3*a*. After release the vial slides down the trough 5, open end first, onto the prong equipped with rollers 6 (FIGS. 3*c*-3*d*). Once a vial is positioned over the prong 6, the prong pivots down to press the vial against the labeler capston 8. Capstan 8 rolls the vial for label application. After labeling the vial is turned up to a vertical position. Spring loaded claw 9 (FIG. 3*b*) holds the vial. The robotic arm lifts and inverts the vial and then moves to the medicament dispensing position.

Screw Singulator

Figure 2A:
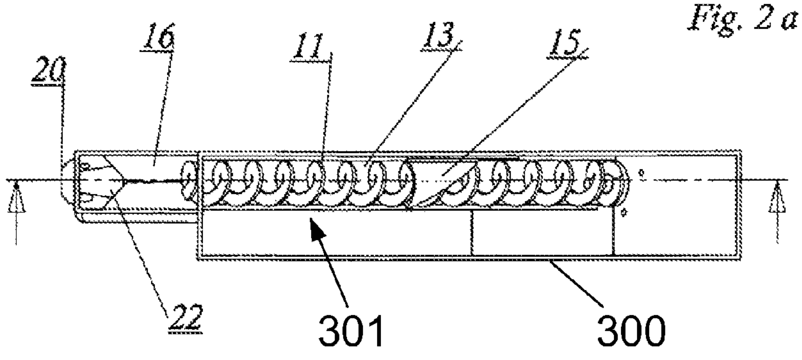
FIGS. 2*a*-2*f* show a preferred screw singulator.
Figure 2B:
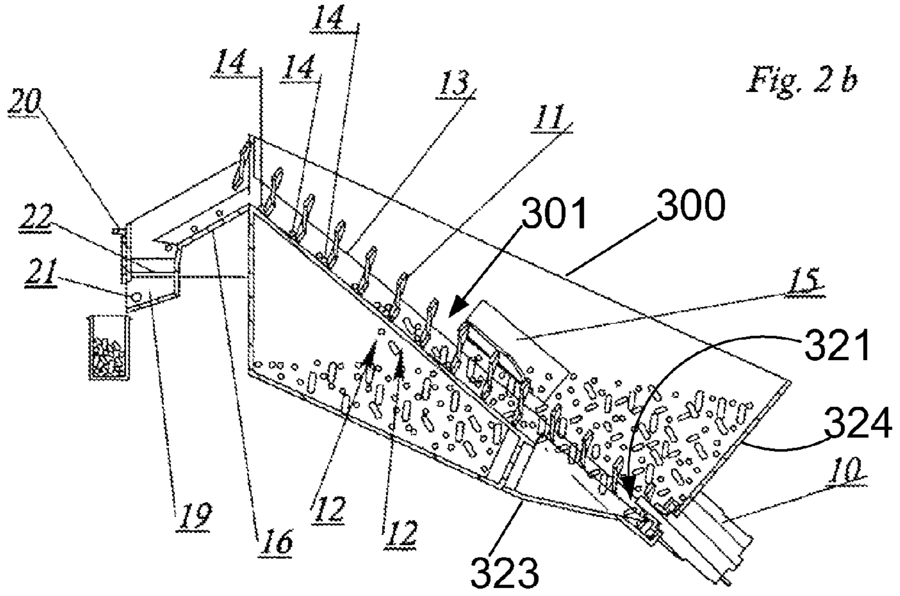
Figure 2B:
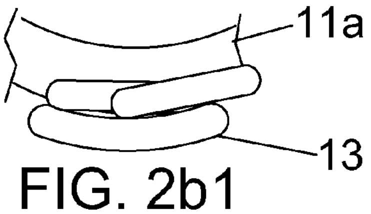
Figure 2B:
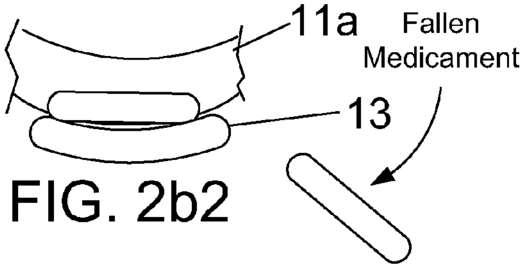
Figure 2C:
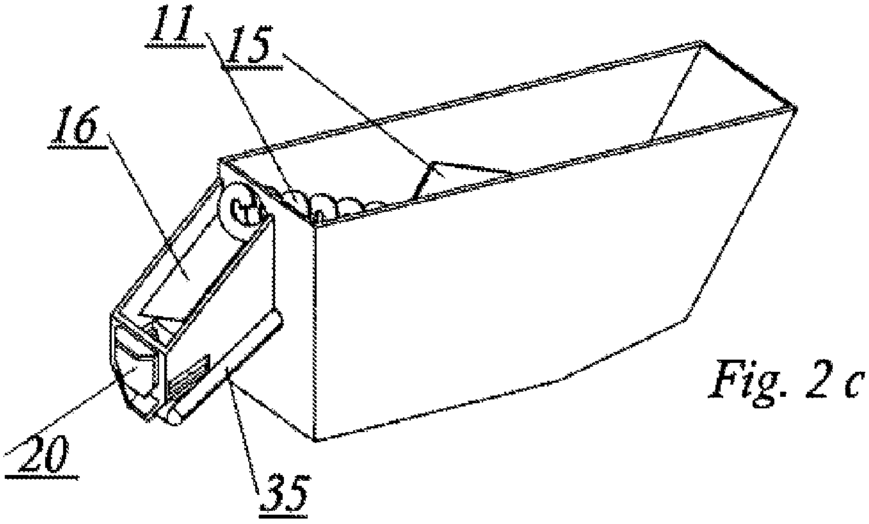

FIGS. 2*a*-2*c* show details of medicament supply bin 300 with an inclined screw singulator 301 having rotating helix 11 and a fixed open top trough 13. Helix 11 is driven by direct current motor 10 to raise medicaments up the trough from the bottom to top of the helix 11. Once the medicaments on helix 11 rise above the medicament supply bin medicament level, the inclination of approximately 40 degrees causes excess medicaments 12 to tumble back out of the trough 13 with good singulation on the remaining medicaments 14 in the trough. The angle (pitch) of the helix is preferably approximately 40 degrees and trough 13 is sufficiently smooth so as to exclude the possibility of friction leading to pinching of the medicaments. This described configuration is optimal to singulate the medicaments towards the helix top fall out of the open top slot of the trough one-by-one in a singulated fashion. It should also be noted that supply bin 300 is preferably shaped and tilted so that to direct medicaments back towards to lowest position 321 of trough 13. For example supply bin sides 323 and 324 are directing medicaments into trough 13 at position 321 near motor 10, as shown.

It should also be noted that it is possible to vary the size of the trough to make it easier or more difficult for medicaments to stay within the trough. For example, FIGS. 2*b*1 and 2*b*2 show helix 11*a* and trough 13*a*. In this preferred embodiment, the cross section size of trough 13*a* is only slightly larger than the longest dimension of the medicament. This makes it easier for medicaments to fall off the trough and back into the supply bin during operation. Hence, singulation is more likely to occur.

The stationary open top trough and the rotational helix are self regulating and clearing, making jam-ups virtually impossible. In a preferred embodiment shown in FIG. 2*b*, guide 15 holds the helix down in the trough. Rotational speed of the helix is self learning and manipulated by software for the various medicament sizes. At the top of trough 13 the medicaments fall onto slide 16 to further increase singulation. Medicaments move down the slide at very close to the same speed. This implies that, due to the constant of gravity, and almost equal starting velocity, all the medicaments must follow very close to the same trajectories 18 (FIG. 2*f*). Round medicaments are typically unstable, but by running down the trough are imparted a rotational movement on exiting the dispenser. This rotation gives these medications, anti-tumble stability through gyroscopic action.

Figure 2D:
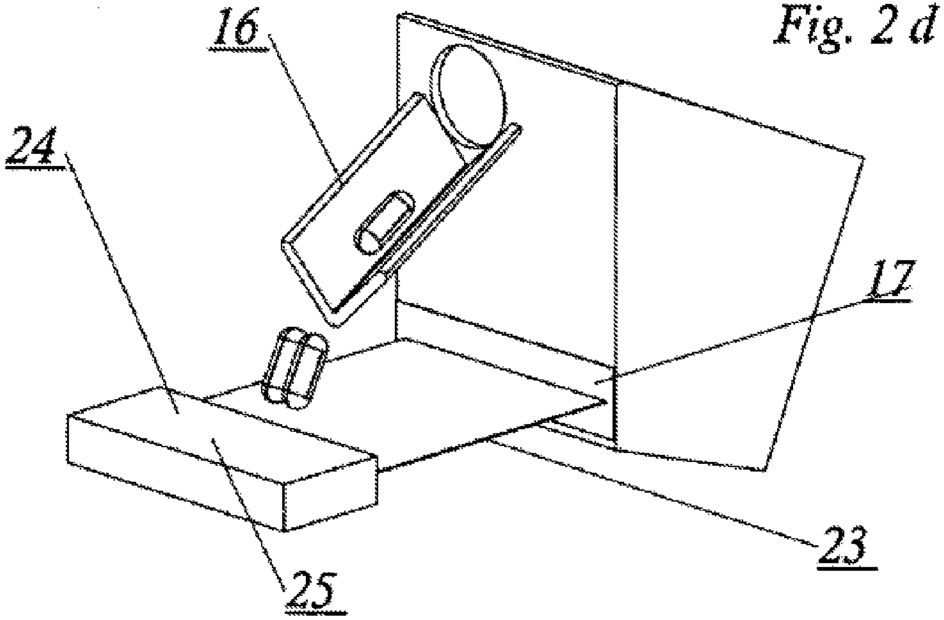
Figure 2E:
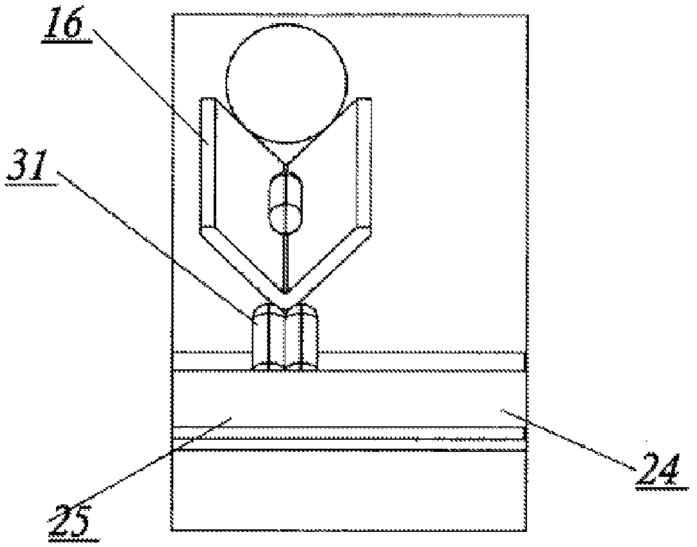
Figure 2F:
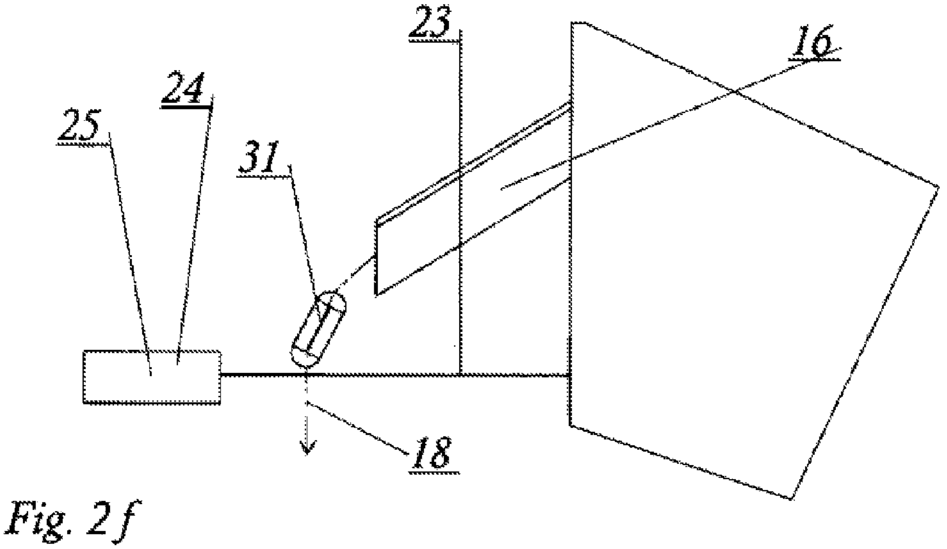

Concurrently falling side-by-side medicaments are shown in FIG. 2*d*. FIG. 2*e* is a front view of slide 16 showing one medicament next to another. FIG. 2*d*, using light emitter 24 and light sensor array 25, to monitor detection laminar zone 23, is the basis of using only one charge coupled device (CCD) or CMOS array. From this angle it can be determined if one, two or three medicaments are present to be counted. This process is by a very high speed digital signal processor (DSP). The parameters of each and every medicament supply bin is continuously learned and, together with other medicament supply bin specific parameters, updated to a data base. The reference strip is 17. When commencing vial filling at a new medicament supply bin, the appropriate parameters are retrieved from the data base to precisely control all aspects of the dispensing.

After leaving the laminar detection counting zone, the medicaments pass down to a special holding zone 19. This holder is equipped with exit door 20. Door 20 passes the medicaments to the vial, or a return means to return them to the medicament supply bin.

Counting plane 22 is shown. This return means to medicament supply bin could be by air jet 21. Return channel 35 is shown (FIG. 2*c*). During normal initial counting door 20 when open allows for the flow of medicaments to the vial (FIG. 2*b*). As the total count is approached the medicaments' free path to the vial is closed and the medicaments are held back in the holder. At this point the count in the holding area is monitored to ascertain that the total of vial contents plus holding contents does not exceed the total count. Should this be the case the medicaments in the holding section are returned to the medicament supply bin via channel 35 and the system continues iteration until the right count is achieved. A concurrent multitasking embodiment is envisaged where the final count can held in the output chute until it can be serviced by the robot arm. Vial drop off position 27 (FIG. 1*a*) is shown with release mechanism 26 (FIG. 1*a*). Medication collation is on multiple conveyor rows 28. FIG. 1*a* a shows an arrow on medication collation conveyor 28 to show direction of travel after a vial has been dropped of on conveyor 28 by vial gripper-arm. At location 32 an electronic ID device is attached for locating the different items of a specific patient's prescription.

A fiber optic linking system, not shown in the drawings, is arranged with interfacing connectors between the frame and medicament supply bins so that a signal being carried by the link would be interrupted if a medicament supply bin was removed. This interruption would indicate a medicament supply bin was moved and would initiate a system scan, using the robotic arm equipped with a scanner and indicia on each medicament supply bin, to ascertain and log the position of all medicament supply bins to a data base.

Figure 4A:
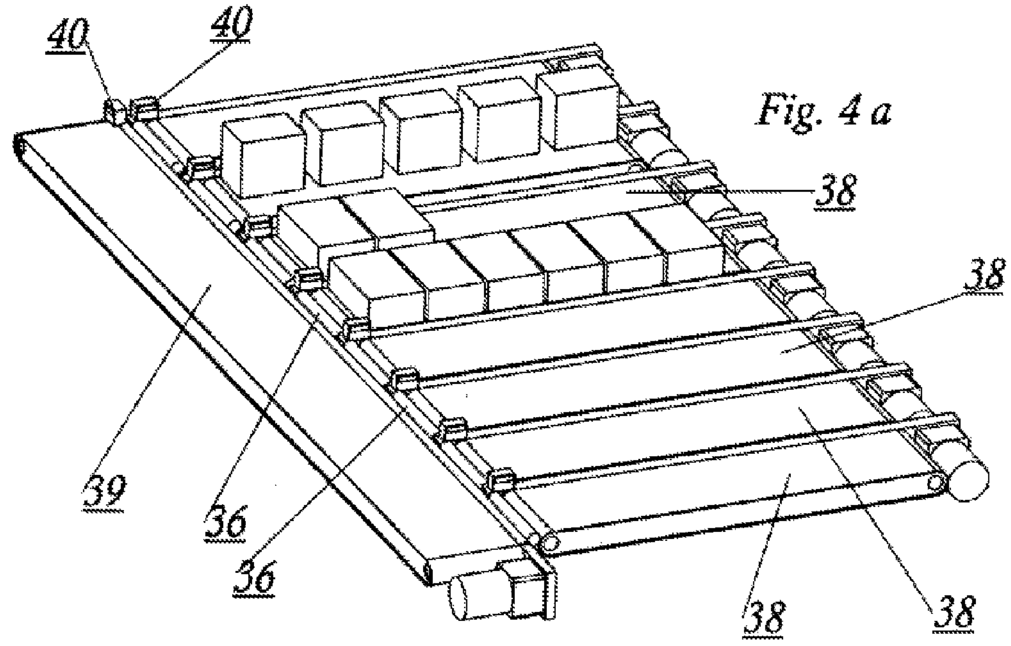
FIGS. 4*a*-4*b* show preferred conveyors.
Figure 4B:
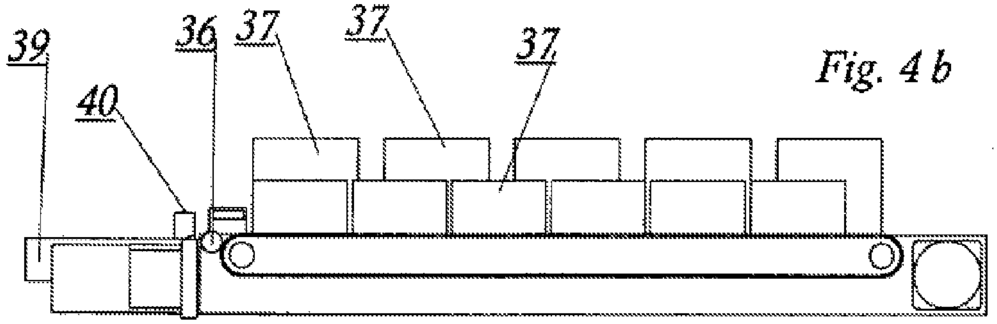

In FIGS. 4*a* and 4*b*, pre-packed medication 37 is housed on pre-packed bulk supply conveyors 38 which may, depending on size of medication, be in stacked or linear form. If in stacked form, a minimal restraint arm would allow the top remaining quantity to be stacked one position down when the conveyor, with greater friction, withdraws the bottom pre-pack from the stack one by one. If stacking is due to shape or dimensions not possible, the larger pre-packed medications lie flat on the pre-packed bulk supply conveyor. At the end of each pre-packed bulk supply conveyor is an independently driven roller 36 with higher frictional coating than the conveyors. Light sensor 40 initiates the transfer to the roller 36 to the transfer conveyor 39. As the medication traverses this roller, its weight on the roller, which is very slightly higher than either the conveyors, causes increased force and thus friction on the roller to move the medication over to the next conveyor.

Holding conveyors can be coupled together to form larger compartments.

Other Preferred Screw for Improved Singulation

Figure 5:
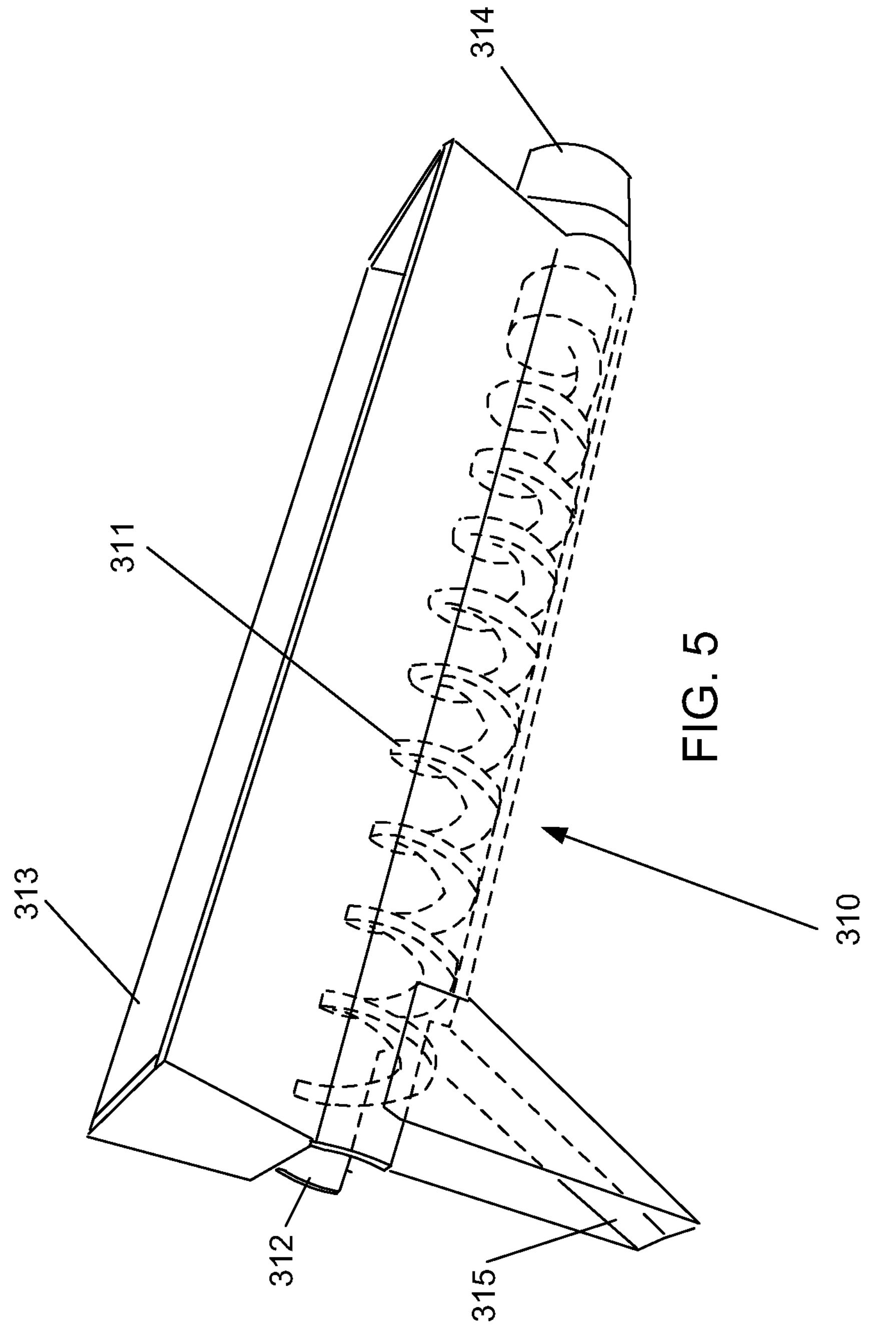
FIGS. 5-8 show another preferred screw singulator.
Figure 6:
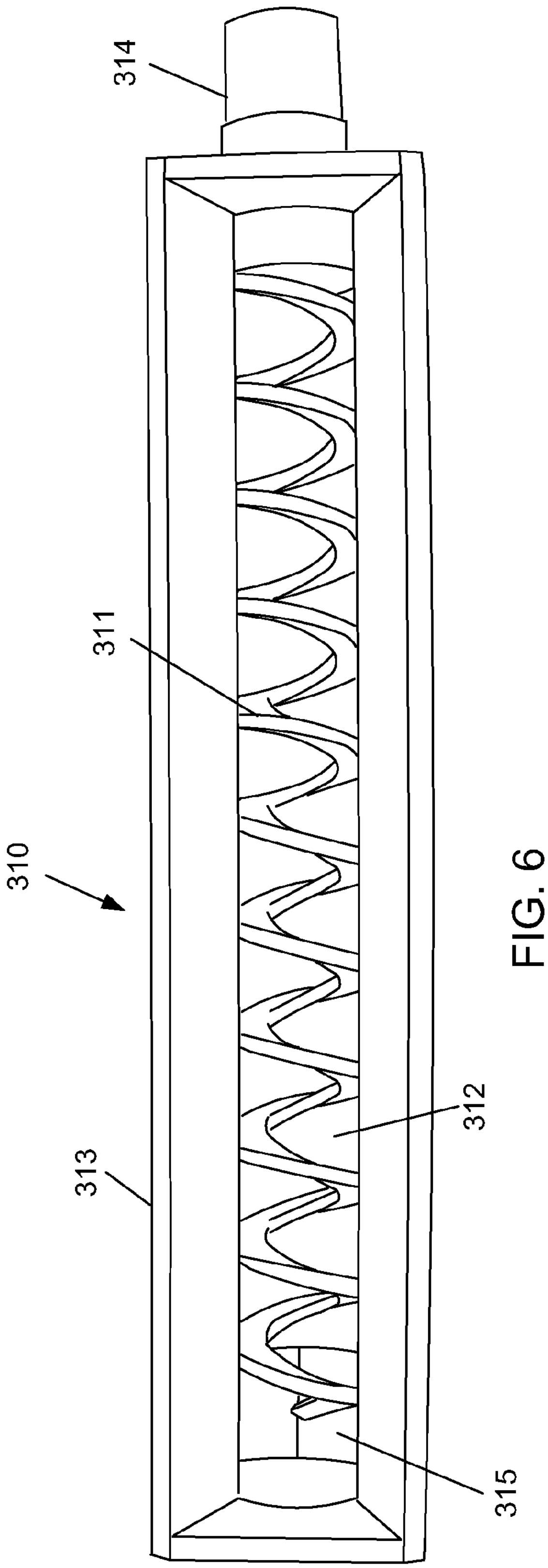

FIGS. 5 and 6 show another preferred embodiment of the present invention. In this preferred embodiment medicament supply bin 310 includes helix 311 that extends along its bottom portion. Trough 312 extends along the bottom and sides of helix 311. Trough 312 is open along the top of helix 311. Motor 314 is connected to the rear of helix 311 and functions to turn helix 311 clockwise to move medicaments upward for singulation. Slide 315 is connected to the upper end of open trough 312 and functions to direct medicaments as they fall downward from open trough 312 in a fashion similar to that described above in reference to the earlier described embodiments.

Medicament Retainer

Medicament supply bin 310 includes medicament retainer 313 attached to the top portion of open trough 312. Medicament retainer 313 prevents medicaments from falling out of reach of helix 311 as helix 311 is transporting medicaments upward for singulation. Medicament retainer 313 is a major feature of this preferred embodiment. By utilization of medicament retainer 313, it is ensured that all medicaments will be in proximity of helix 311 as they fall back so that they can be transported upward for singulation.

Open Trough

Figure 8:
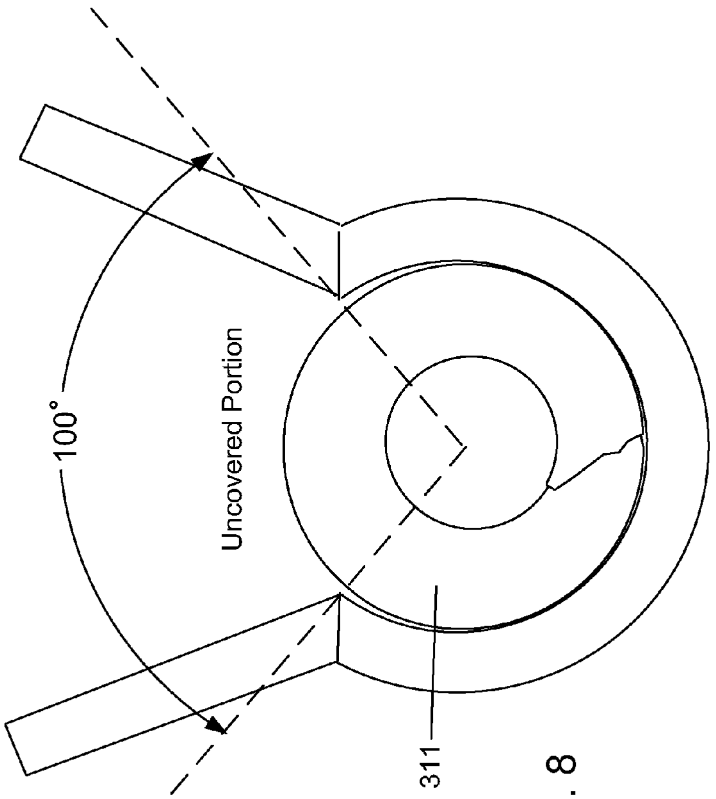
Figure 7:
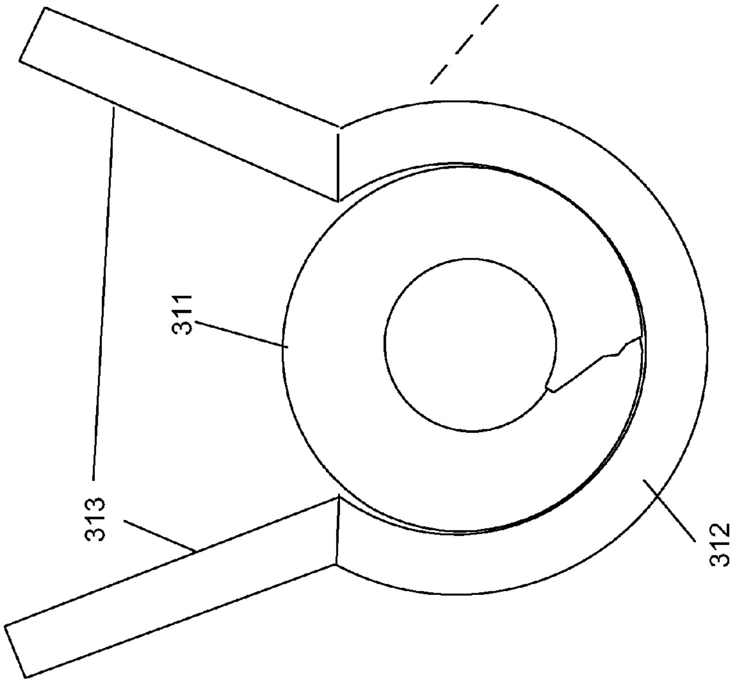

As stated above medicament supply bin 310 includes open trough 312. A front view of open trough 312 is shown in FIGS. 7 and 8. Applicant has determined through experimentation that in a preferred embodiment, open trough 312 will allow for approximately 100 degrees of an uncovered section for helix 311. This allows for optimum singulation of medicaments as they are transported upward for singulation. For example, the open section at the top of open trough 312 allows for excess medicaments to fall backwards. The openness also prevents medicament jamming of helix 311.

Other Preferred Embodiments

The medicament counting accuracy of the dispensing means, as detailed above, lends itself to an embodiment of a general purpose, desk top medicament counter. In another preferred embodiment, instead of dispensing to vials, medicaments are dispensed to a central chute system for take off to a pouch or bagging system.

CONCLUSION

The improvements under the present invention provide new wide ranging performance improvements beyond the expectancy of the changes. The greater degree of automation, increased speed, collation and accuracy of dispensing, allows pharmacists more peace of mind and quality time with patients. The system cost effectiveness results in a sound business model with quick realization of investment. By adequately addressing pre-packaged medication, the invention becomes viable as an export product.

In one embodiment the return means of the medicament holding system could be an air jet and in another the means could be an electric solenoid.

What is claimed is:

1. An automated medicament dispensing machine for dispensing and counting individual medicaments, comprising:

A. at least one medicament supply bin for holding a plurality of medicaments, and B. a singulator extending inside said at least one medicament supply bin, wherein said singulator is for singulating said plurality of medicaments, said singulator comprising:

1. a tilted helix,
2. a trough extending along the bottom and sides of said helix, wherein said trough is open at the top of said helix,
3. a motor connected to said helix, wherein said motor is for rotating said helix, and
4. an open medicament retainer attached to the top of said trough, said open medicament retainer for providing clearance for excess medicaments to fall backwards over the top of said helix as medicaments are singulated and further comprising a means for preventing said excess medicaments from falling clear of said helix as said excess medicaments fall backwards over the top of said helix, and C. a programmable dispensing control system programmed to control said automated medicament dispensing machine, D. at least one vial bulk supply bin for storing and dispensing vials, E. a robotic arm, F. a vial gripper attached to said robotic arm, said vial gripper comprising, 1. a sensor system carried on said vial gripper, said sensor system defining a laminar counting plane through which medicaments fall, said sensor system comprising:
   - i. an optical emitter for illuminating said laminar counting plane,
   - ii. an optical receiving array with individually monitored pixels, adopted to monitor optical signals generated by said optical emitter that have been reflected off said individual medicaments as they pass through said laminar counting plane, and
   - iii. a digital signal processor positional computing means for analyzing pixel patterns produced by said optical receiving array and for informing said dispensing control system of the correct number of medicaments simultaneously passing through said laminar counting plane D. wherein said optical emitter and optical receiving array are positioned so that medicaments that fall together are positioned side-by-side with respect to the optical emitter and receiving array and not one in front of the other so as to obscure one of the medicaments.

2. The automated machine as in claim 1, wherein said at least one medicament supply bin is tilted so as to direct fallen medicaments back inside said trough.

3. The automated machine as in claim 1, wherein said at least one medicament supply bin comprises a lowest point, wherein said plurality of medicaments fall from said trough into said at least one medicament supply bin, wherein said fallen medicaments are directed towards said lowest point for re-entry into said trough.

4. The automated machine as in claim 1, wherein the cross section size of the medicament is slightly larger than the longest dimension of said medicament to increase the likelihood of singulation.

5. The automated machine as in claim 1, wherein said trough leaves approximately 100 degrees of said helix uncovered at the top of said helix.

6. The automated machine as in claim 1, wherein said at least one medicament supply bin further comprises:

A. a dispenser for dispensing said plurality of medicaments into vials, and

B. a slide for imparting rotational spin to round medicaments, and orientating concurrently dropped medicaments side-by-side.

7. The automated machine as in claim 1, wherein said medicament retainer comprises a plurality of oppositely opposed vertical walls tilted outwards with respect to each other, wherein each wall is rigidly attached to said open trough.

* * * * *